United States Patent
Janardhana et al.

(10) Patent No.: US 10,864,787 B2
(45) Date of Patent: Dec. 15, 2020

(54) SYSTEMS AND METHODS FOR A HUMAN MACHINE INTERFACE FOR A TRAILER HITCH SYSTEM

(71) Applicant: Robert Bosch GmbH, Stuttgart (DE)

(72) Inventors: Rajani Janardhana, Northville, MI (US); Gary B. Ward, Brighton, MI (US)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 15/658,923

(22) Filed: Jul. 25, 2017

(65) Prior Publication Data
US 2018/0029429 A1     Feb. 1, 2018

Related U.S. Application Data

(60) Provisional application No. 62/367,733, filed on Jul. 28, 2016.

(51) Int. Cl.
*B60W 10/20* (2006.01)
*B60W 30/09* (2012.01)
(Continued)

(52) U.S. Cl.
CPC .............. *B60D 1/36* (2013.01); *B60D 1/62* (2013.01); *B60R 1/00* (2013.01); *B62D 15/025* (2013.01);
(Continued)

(58) Field of Classification Search
CPC ... B60D 1/36; B60D 1/62; B60D 1/06; B62D 15/028; B62D 15/025; B62D 5/0463;
(Continued)

(56) References Cited

U.S. PATENT DOCUMENTS 5,754,123 A * 5/1998 Nashif ................. B60Q 9/007
                                                 340/435
6,253,138 B1 * 6/2001 Shober ................... F16H 59/12
                                                  477/34
(Continued)

FOREIGN PATENT DOCUMENTS

WO     2015074016 A1     5/2015

OTHER PUBLICATIONS

Extended European Search Report from the European Patent Office for Application No. 17183338.7 dated Apr. 3, 2018 (5 pages).

*Primary Examiner* — Christian Chace
*Assistant Examiner* — Aaron C Smith
(74) *Attorney, Agent, or Firm* — Michael Best & Friedrich LLP

(57) ABSTRACT

Systems and methods for a human machine interface for a trailer hitch system. One method includes receiving, a first user input, and presenting on a display a captured video image including a coupler, and determining an area into which the vehicle can be guided. The method includes presenting an indication of the area overlaying the captured video image. The method includes, in response to receiving a second user input indicating a location relative to the coupler, and when the vehicle is not in a reverse gear, presenting a visual command to put the vehicle in the reverse gear, and, when the vehicle is in the reverse gear, automatically steering the vehicle to the coupler based on the location. The method includes, during the automatic steering, receiving the speed of the vehicle, and, when the speed exceeds a threshold, presenting on the display a second visual command to slow the vehicle.

16 Claims, 12 Drawing Sheets

(51) Int. Cl.
   *B60D 1/36*     (2006.01)
   *B60D 1/62*     (2006.01)
   *B60R 1/00*     (2006.01)
   *B62D 15/02*    (2006.01)
   *G01P 3/00*     (2006.01)

(52) U.S. Cl.
   CPC ...... *B62D 15/028* (2013.01); *B60R 2300/808* (2013.01); *G01P 3/00* (2013.01)

(58) Field of Classification Search
   CPC ........ B62D 7/159; B62D 6/008; B62D 13/06; B62D 15/027; B62D 6/00; B60Q 1/00; B60R 1/00; B60R 2300/808; B60R 1/003; B60R 2300/607; G01P 3/00; B60W 10/20; B60W 2510/20; B60W 2540/18; B60W 30/09
   See application file for complete search history.

(56) References Cited

U.S. PATENT DOCUMENTS

| | | | |
|---|---|---|---|
| 8,038,166 B1 | 10/2011 | Piesinger | |
| 8,138,899 B2 | 3/2012 | Ghneim | |
| 8,798,842 B2 | 8/2014 | Woolf et al. | |
| 8,888,120 B2 | 11/2014 | Trevino | |
| 2002/0010661 A1* | 1/2002 | Waddington | G06Q 10/08 705/28 |
| 2005/0074143 A1 | 4/2005 | Kawai | |
| 2009/0158188 A1* | 6/2009 | Bray | F24F 11/001 715/771 |
| 2009/0287383 A1* | 11/2009 | Fujii | F16H 3/3491 701/51 |
| 2010/0096203 A1* | 4/2010 | Freese, V | B60D 1/36 180/167 |
| 2010/0324770 A1 | 12/2010 | Ramsey et al. | |
| 2011/0080305 A1* | 4/2011 | Toledo | B62D 15/028 340/932.2 |
| 2013/0076007 A1 | 3/2013 | Goode et al. | |
| 2013/0193918 A1* | 8/2013 | Sarkar | B60L 3/04 320/109 |
| 2013/0321634 A1 | 12/2013 | Okano et al. | |
| 2014/0012465 A1* | 1/2014 | Shank | B60D 1/58 701/36 |
| 2014/0172240 A1* | 6/2014 | Schemmel | B60T 17/18 701/49 |
| 2015/0115571 A1* | 4/2015 | Zhang | B60D 1/06 280/477 |
| 2015/0138340 A1* | 5/2015 | Lavoie | B62D 13/06 348/118 |
| 2016/0023601 A1* | 1/2016 | Windeler | B60R 1/00 348/118 |
| 2016/0371983 A1* | 12/2016 | Ronning | G08G 1/168 |
| 2017/0021828 A1* | 1/2017 | Seo | B60W 30/06 |
| 2017/0151846 A1* | 6/2017 | Wuergler | B60D 1/62 |

* cited by examiner

SYSTEMS AND METHODS FOR A HUMAN MACHINE INTERFACE FOR A TRAILER HITCH SYSTEM

CROSS-REFERENCE TO RELATED APPLICATIONS

The present application is related to and claims priority to U.S. Provisional Patent Application Ser. No. 62/367,733, filed Jul. 28, 2016, titled "SYSTEMS AND METHODS FOR A HUMAN MACHINE INTERFACE FOR A TRAILER HITCH SYSTEM", the entire contents of which being incorporated herein by reference.

FIELD

Embodiments of the present invention are related to the field of automotive control systems.

SUMMARY

Figure 1:
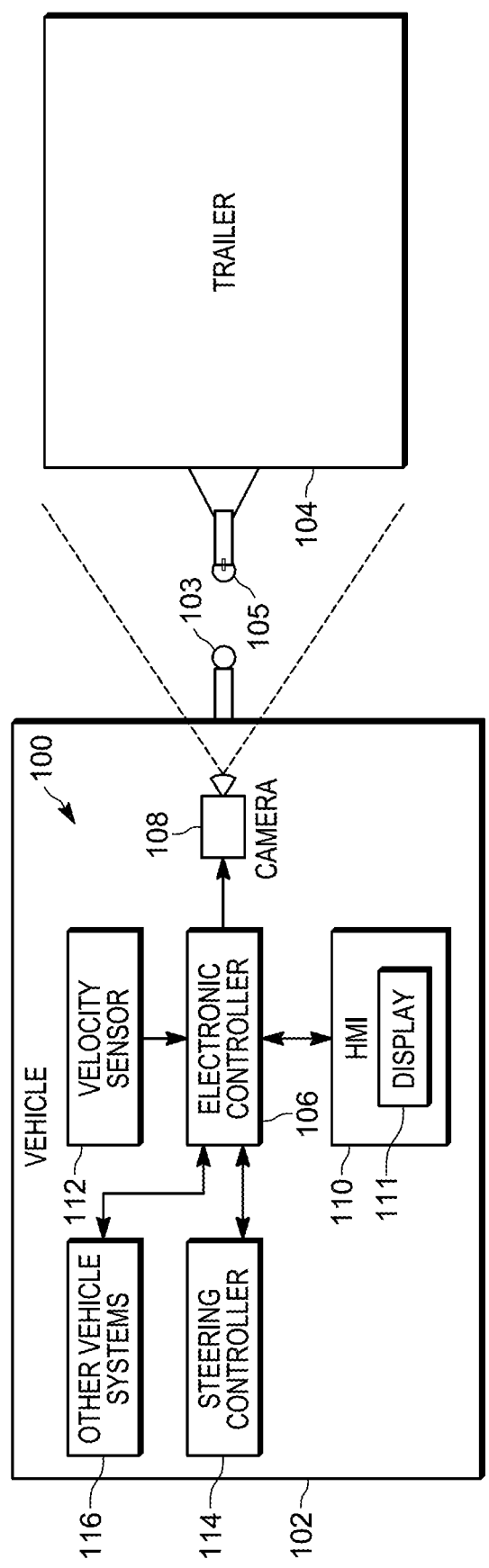
FIG. 1 is a block diagram of a trailer hitch guidance system, according to some embodiments.

Embodiments presented herein include a trailer hitch guidance system. One embodiment of the system includes a rear-view camera and an intuitive human machine interface (HMI) to receive initial target information, guide user interaction, inform the user of the system status, and direct the user to take appropriate action. The user controls the throttle, brake, and gear of the vehicle and the system tracks the position of the remote target coupler, dynamically. The system also determines the vehicle path to align the hitch to the coupler, and automatically steers the vehicle accordingly.

One embodiment provides a trailer hitch guidance system for a vehicle. The system includes a display, a user interface, a camera, a velocity sensor configured to measure a speed of the vehicle, and an electronic controller communicatively coupled to the display, the user interface, and the velocity sensor. The electronic controller is configured to receive, via the user interface, a first user input. The electronic controller is configured to present on the display a captured video image from the camera, the captured video image including a coupler. The electronic controller is configured to determine within the captured video image an area into which the vehicle can be guided. The electronic controller is configured to present on the display an indication of the area overlaying the captured video image. The electronic controller is configured to, in response to receiving a second user input indicating a location relative to the coupler, and when the electronic controller determines that the vehicle is not in a reverse gear, present, on the display, a visual command to put the vehicle in the reverse gear. The electronic controller is configured to, when the vehicle is in the reverse gear, activate an automatic steering of the vehicle to steer the vehicle to the coupler based on the location. The electronic controller is configured to, during the automatic steering the vehicle, receive, from the velocity sensor, the speed of the vehicle. The electronic controller is configured to, when the speed exceeds a first predetermined speed threshold, present on the display a second visual command to slow the vehicle.

Another embodiment provides a trailer hitch guidance method for a vehicle. The method includes receiving, via a user interface, a first user input. The method includes presenting on a display a captured video image from a camera, the captured video image including a coupler. The method includes determining within the captured video image an area into which the vehicle can be guided. The method includes presenting on the display an indication of the area overlaying the captured video image. The method includes, in response to receiving a second user input indicating a location relative to the coupler, and when the vehicle is not in a reverse gear, presenting, on the display, a visual command to put the vehicle in the reverse gear. The method includes, when the vehicle is in the reverse gear, activating an automatic steering of the vehicle to steer the vehicle to the coupler based on the location. The method includes, during the automatic steering, receiving, from the velocity sensor, the speed of the vehicle. The method includes, when the speed exceeds a first predetermined speed threshold, presenting on the display a second visual command to slow the vehicle.

DETAILED DESCRIPTION

Before any embodiments are explained in detail, it is to be understood that the examples presented herein are not limited in their application to the details of construction and the arrangement of components set forth in the following description or illustrated in the following drawings. Embodiments may be practiced or carried out in various ways.

It should also be noted that a plurality of hardware and software based devices, as well as a plurality of different structural components may be used to implement the embodiments presented herein. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more processors. As such, it should be noted that a plurality of hardware and software based devices, as well as a plurality of different structural components may be utilized to implement the embodiments presented. For example, "control units" and "controllers" described in the specification can include one or more processors, one or more memory modules including non-transitory computer-readable medium, one or more input/output interfaces, and various connections (for example, a system bus) connecting the components.

For ease of description, each of the example systems presented herein is illustrated with a single exemplar of each of its component parts. Some examples may not describe or illustrate all components of the systems. Other embodiments may include more or fewer of each of the illustrated components, may combine some components, or may include additional or alternative components.

FIG. 1 is a block diagram of one example embodiment of a trailer hitch guidance system 100. The trailer hitch guidance system 100 is included in a vehicle 102. The vehicle 102 is equipped with a trailer hitch 103, positioned at the rear of the vehicle 102. The trailer 104 has a trailer coupling (coupler) 105 positioned at the front of the trailer 104. The trailer hitch 103, as illustrated, is a ball type trailer hitch, having a ball, which is received by a recess of the trailer coupler 105 to hitch the trailer 104 to the vehicle 102. This should not be considered limiting. The systems and methods described herein are applicable to other types of trailer hitches.

The trailer hitch guidance system 100 includes an electronic controller 106, a camera 108, a human machine interface (HMI) 110, a velocity sensor 112, a steering controller 114, and other vehicle systems 116. The electronic controller 106, the camera 108, the human machine interface (HMI) 110, the velocity sensor 112, the steering controller 114, and the other vehicle systems 116, as well as other various modules and components of the vehicle 102 are coupled to each other by or through one or more control or data buses (for example, a CAN bus), which enable communication therebetween. The use of control and data buses for the interconnection between and exchange of information among the various modules and components would be apparent to a person skilled in the art in view of the description provided herein.

In some embodiments, the electronic controller 106 includes a plurality of electrical and electronic components that provide power, operational control, and protection to the components and modules within the electronic controller 106. The electronic controller 106 includes, among other things, an electronic processor (for example, an electronic microprocessor, microcontroller, or other suitable programmable device), a memory, and an input/output interface. The electronic processor, the memory, and the input/output interface, as well as the other various modules are connected by one or more control or data buses. In some embodiments, the electronic controller 106 is implemented partially or entirely in hardware (for example, using a field-programmable gate array ("FPGA"), an application specific integrated circuit ("ASIC"), or other devices.

The memory 106 can include one or more non-transitory computer-readable media, and includes a program storage area and a data storage area. As used in the present application, "non-transitory computer-readable media" comprises all computer-readable media but does not consist of a transitory, propagating signal. The program storage area and the data storage area can include combinations of different types of memory, for example, read-only memory ("ROM"), random access memory ("RAM"), electrically erasable programmable read-only memory ("EEPROM"), flash memory, or other suitable digital memory devices. The electronic processor is connected to the memory and executes software, including firmware, one or more applications, program data, filters, rules, one or more program modules, and other executable instructions. The electronic processor retrieves from the memory and executes, among other things, instructions related to the control processes and methods described herein. In other embodiments, the electronic controller 106 may include additional, fewer, or different components.

The camera 108 is a rear-facing video camera, positioned to capture video images of an area to the rear of the vehicle 102, including at least a portion of the vehicle 102 and the trailer hitch 103. The camera 108 may be part of a back-up video camera system. Backup video cameras are known, and will not be described in further detail. Alternative embodiments include more than a single camera 108. In some embodiments the camera 108 is moveable (for example, using pan, tilt, or zoom functions) to capture video images of other areas on or around the vehicle 102.

The human machine interface (HMI) 110 provides an interface between the vehicle 102 and the driver. The HMI 110 is communicatively coupled to the electronic controller 106 and receives input from the driver, receives information from the electronic controller 106, and provides feedback (for example, audio, visual, haptic, or a combination thereof) to the driver based on the received information. The HMI 110 provides suitable input methods, for example, a button, a touch-screen display having menu options, voice recognition, and the like for providing inputs from the driver that may be used by the electronic controller 106 as it controls the vehicle 102.

The HMI 110 provides visual output, for example, graphical indicators (for example, fixed or animated icons), lights, colors, text, images (for example, from the camera 108), combinations of the foregoing, and the like. The HMI 110 includes a suitable display mechanism, for example a display 111, for displaying the visual output, for example, an instrument cluster, a mirror, a heads-up display, a center console display screen (for example, a liquid crystal display (LCD) touch screen, or an organic light-emitting diode (OLED) touch screen), or through other suitable mechanisms. In some embodiments, the HMI 110 includes a graphical user interface (GUI) (for example, generated by the electronic controller 106, from instructions and data stored in the memory, and presented on a center console display screen) that enables a user to interact with the trailer hitch guidance system 100. The HMI 110 may also provide audio output to the driver, for example, a chime, buzzer, voice output, or other suitable sound through a speaker included in the HMI 110 or separate from the HMI 110. In some embodiments, the HMI 110 is configured to provide haptic outputs to the driver by vibrating one or more vehicle components (for example, the vehicle's steering wheel and the driver's seat), for example, through the use of a vibration motor. In some embodiments, HMI 110 provides a combination of visual, audio, and haptic outputs. In some embodiments, the HMI 110 causes the visual, audio, and haptic outputs to be produced by a smart phone, a smart tablet, a smart watch, or any other portable or wearable electronic device communicatively coupled to the vehicle.

The velocity sensor 112 (for example, a vehicle speed sensor) is positioned and configured to sense or measure the speed of the vehicle 102.

The steering controller 114 is coupled to the steering system (not shown) of the vehicle 102. The steering controller 114 is configured to automatically steer the vehicle 102 in response to commands received from, among other things, the electronic controller 106. The steering controller 114 may also receive steering commands from a steering wheel of the vehicle 102 (for example, in a "drive by wire" system). The other vehicle systems 116 include controllers, sensors, actuators, and the like for controlling aspects of the operation of the vehicle 102 (for example, acceleration, braking, shifting gears, and the like). The other vehicle systems 116 are configured to send and receive data relating to the operation of the vehicle 102 to and from the electronic controller 106.

Figure 2:
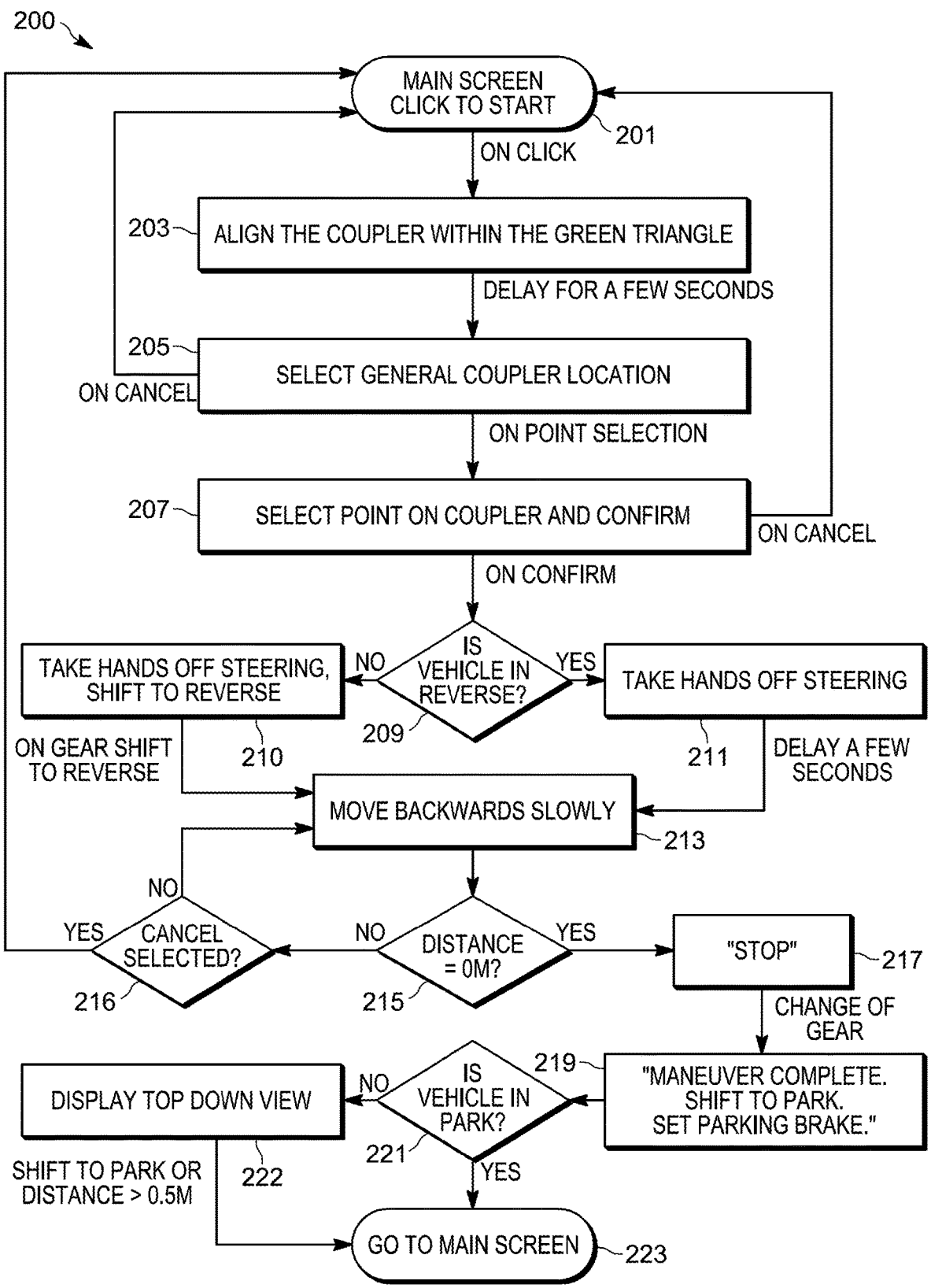
FIG. 2 is a flow chart of method of operating the trailer hitch guidance system of FIG. 1, according to some embodiments.

FIG. 2 is a flowchart illustrating an exemplary method 200 for operating the trailer hitch guidance system 100. Portions of the method 200 are described in terms of the HMI 110 presenting commands visually (for example, on the display 111 of the HMI 110) to a user (for example, the driver of the vehicle 102). However, in some embodiments, such commands may be presented visually, audibly, haptically, or with combinations thereof.

Figure 5:
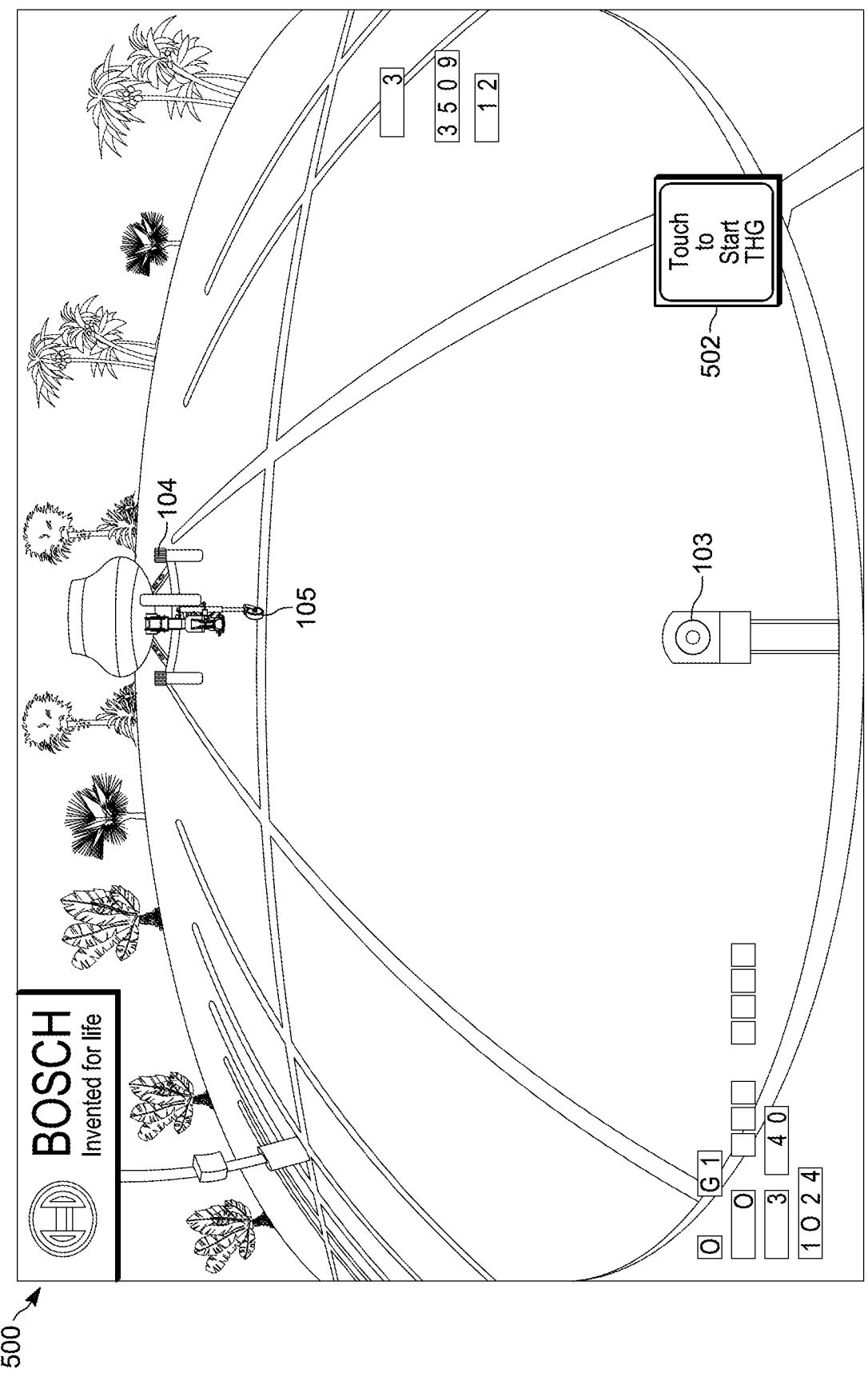
FIG. 5 illustrates an embodiment of a screen displayed by a human machine interface of the trailer hitch guidance system of FIG. 1.

At block 201, the guidance system 100 is activated in response to a user input, for example, when the user selects a start button shown on the display 111 of the HMI 110. FIG. 5 illustrates an exemplary screenshot 500 of the display 111 of the HMI 110 at block 201. The user selects a start button 502, for example, by touching or clicking on a button shown to highlight the start button 502 on display 111.

Figure 6:
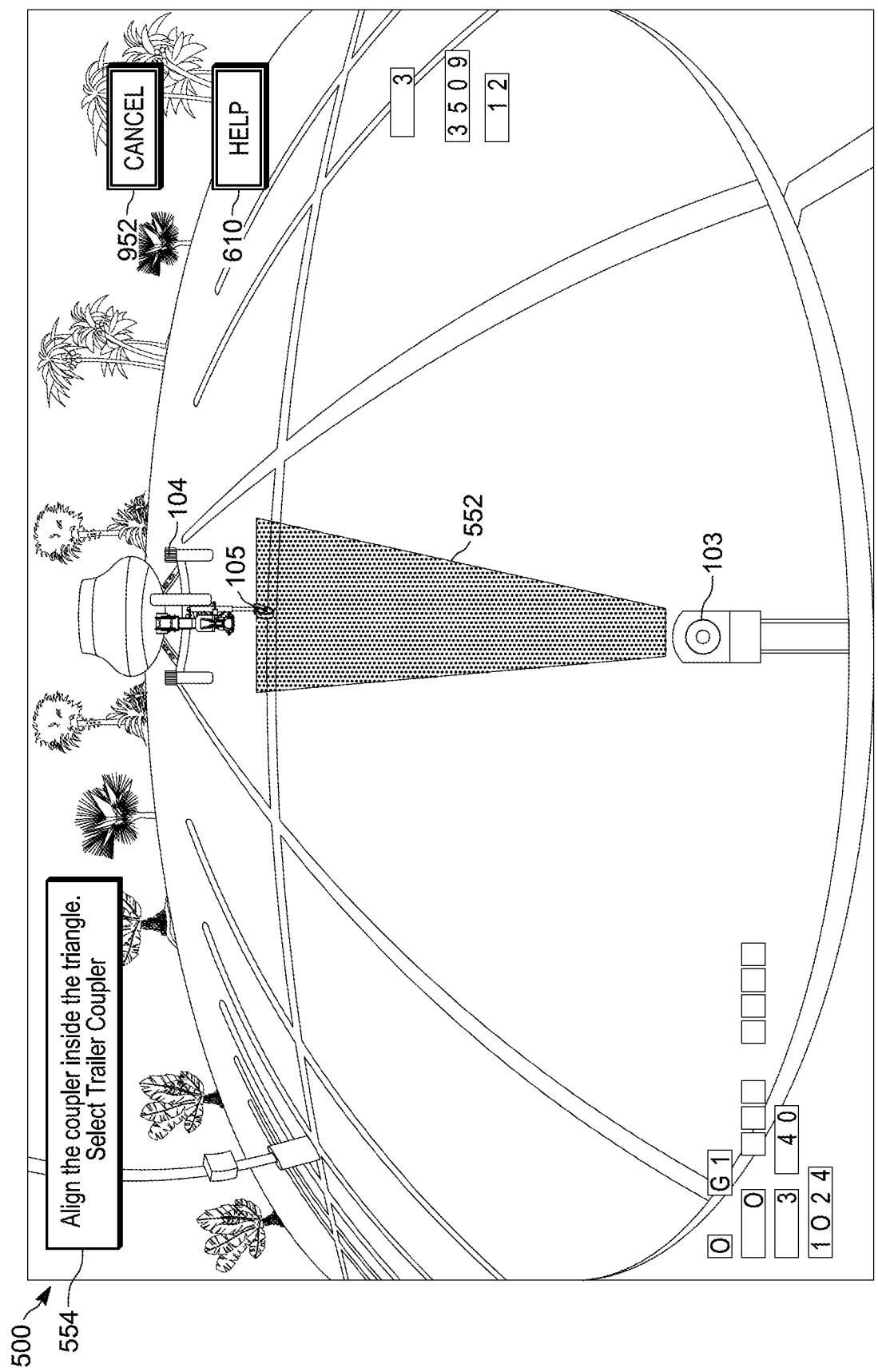
FIG. 6 illustrates an embodiment of a screen displayed by a human machine interface of the trailer hitch guidance system of FIG. 1.

Returning to FIG. 2, at block 203, the HMI 110 presents, in response to the user input, the captured video image from the camera 108 on the display 111. The captured video image from the camera 108 includes the trailer coupler 105. The HMI 110 determines within the captured video image an area into which the vehicle 102 can be guided. FIG. 6 illustrates an exemplary screenshot 550 of the display 111 of the HMI 110 at block 203. The HMI 110 further presents on the display 111 an indication of the area into which the vehicle 102 can be guided overlaying the captured video image. For example, the HMI 110 presents, as shown in FIG. 6, a generated triangle 552 received from the electronic controller 106 on the display 111. The triangle 552 signifies an area, within which the guidance system 100 is able to operate or guide the vehicle 102. Due to steering restrictions of the vehicle 102, the guidance system 100 may be unable to guide the vehicle 102 to a target, for example, the trailer coupler 105, when the target is located in an area outside the triangle 552. Accordingly, in some embodiments, the HMI 110 presents on the display 111 a visual command 554 for the user to align the trailer coupler 105 within the triangle 552.

Returning to FIG. 2, at block 205, the HMI 110 prompts the user to select or indicate the location relative to the trailer coupler 105 within the captured video feed from camera 108, as shown on the display 111 of the HMI 110. FIG. 6 illustrates the exemplary screenshot 550 of the display 111 of the HMI 110 at block 203 and at block 205. The visual command 554 prompts the user to select or indicate the location relative to the trailer coupler 105. The user selects the location relative to the trailer coupler 105, for example by highlighting it on the display 111. For example, the user may select the relative location of the trailer coupler 105 from a distance of approximately four meters.

Figure 7:
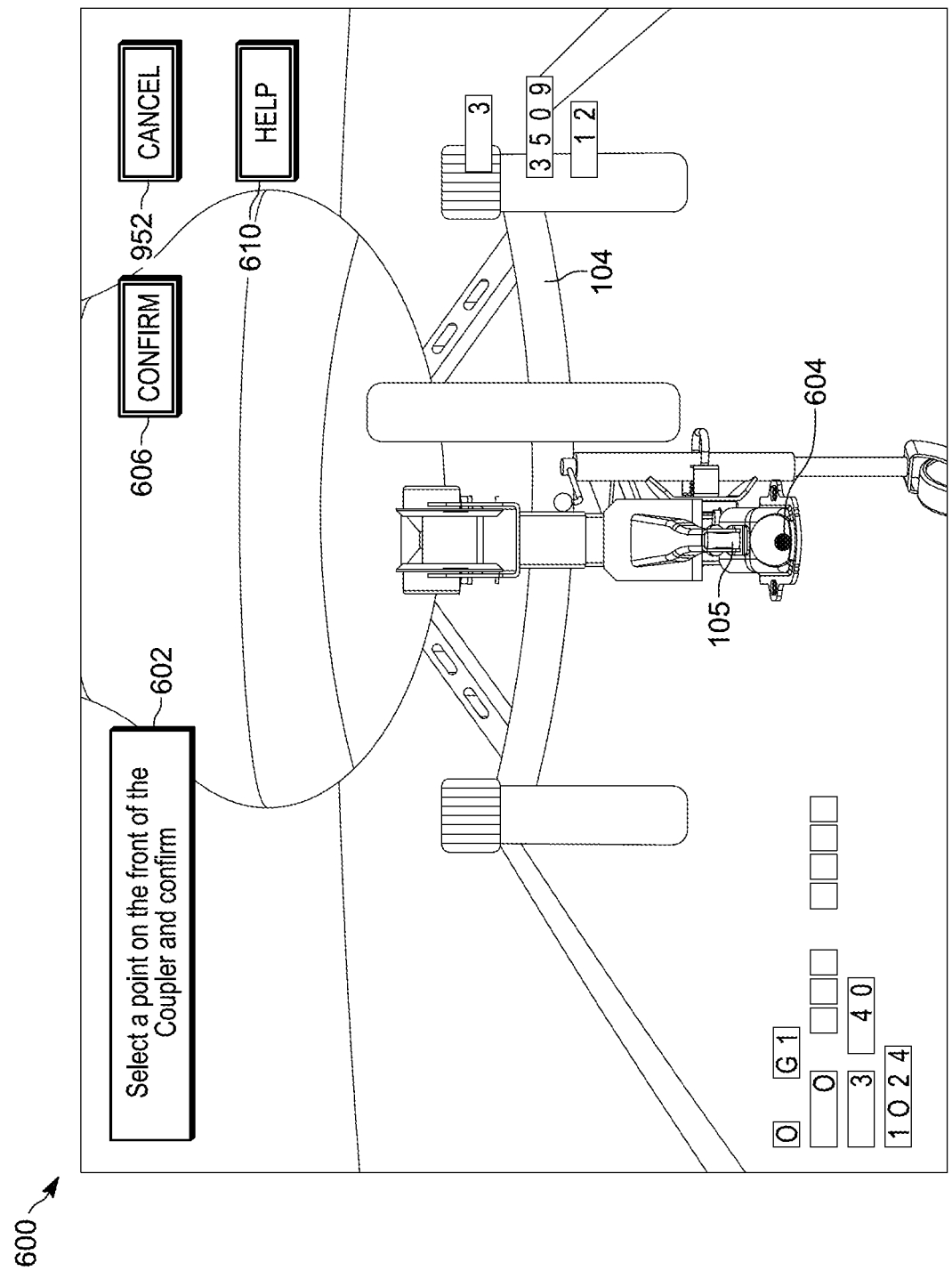
FIG. 7 illustrates an embodiment of a screen displayed by a human machine interface of the trailer hitch guidance system of FIG. 1.

Returning to FIG. 2, in some embodiments, the location selected by the user is an initial location relative to the trailer coupler 105. In such embodiments, the method 200 further includes block 207. At block 207, the electronic controller 106 processes the user input selecting the initial location relative to the trailer coupler 105 received by the HMI 110. The electronic controller 106 determines, based on the input, a zoomed-in or enhanced image of the initial location relative to the trailer coupler 105, and displays the image on the display 111. FIG. 7 illustrates an exemplary screenshot 600 of the display 111 at block 207. The screenshot 600 includes a visual command 602 to prompt the user to select a point 604 relative to the trailer coupler 105 within the screenshot 600. The HMI 110 receives a user input selecting the area or point 604 on the zoomed-in display of the initial location relative to the trailer coupler 105. The user confirms the area or point 604, for example, by touching it on the display 111 or selecting a button, for example a confirmation button 608.

In some embodiments, a "help" command 610 is available at one or more of the blocks 203, 205, and 207 (See FIGS. 6 and 7). The "help" command 610 may be selected by a user to provide one or more further visual commands or prompt with additional detail as to what the user is being commanded to do. In some embodiments, the "help" command 610 is provided at one or more blocks of the method 200.

Figure 8:
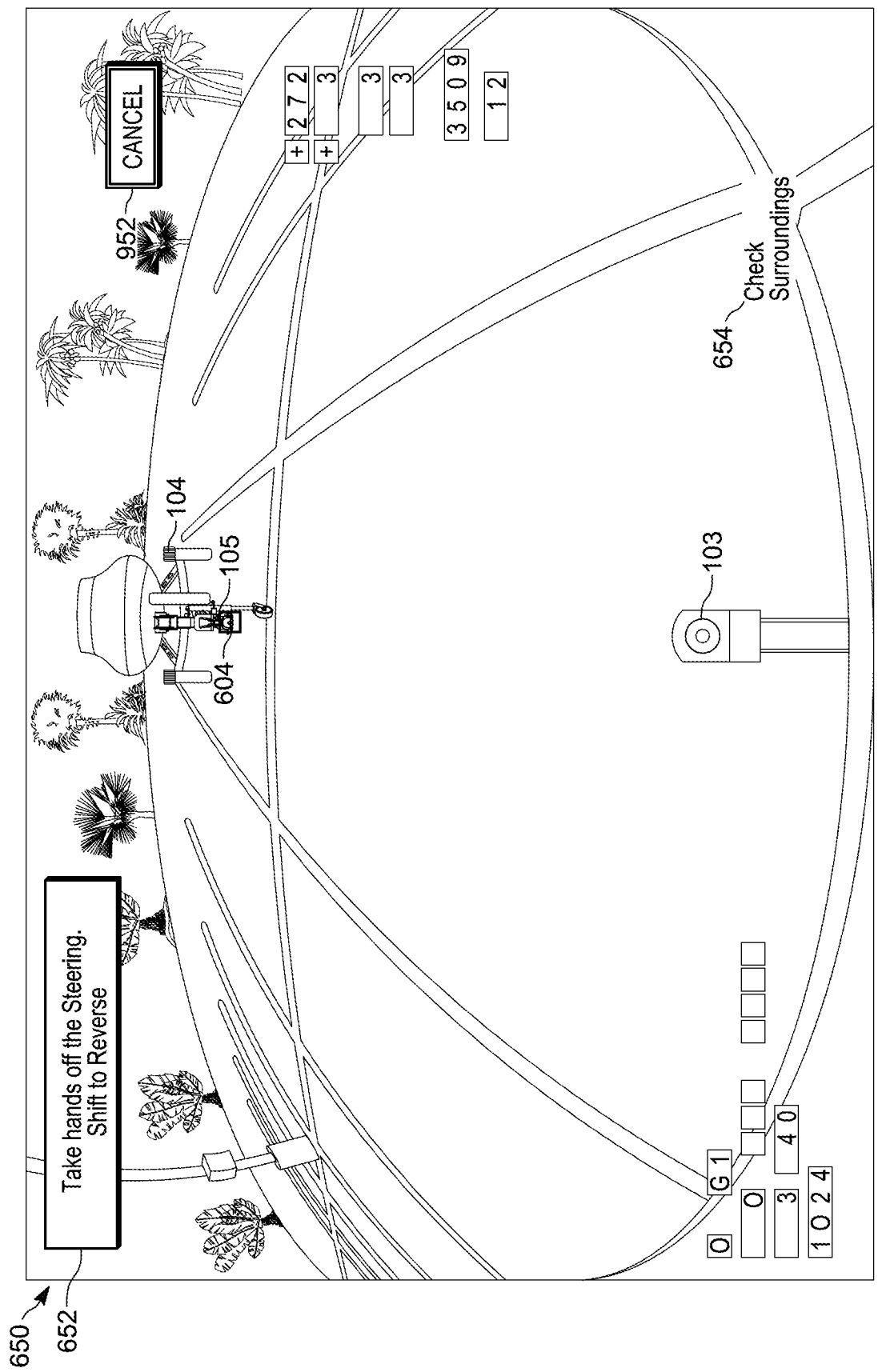
FIG. 8 illustrates an embodiment of a screen displayed by a human machine interface of the trailer hitch guidance system of FIG. 1.

Returning to FIG. 2, at block 209, the guidance system 100 determines if the vehicle 102 is in reverse gear. The electronic controller 106 may detect the current gear of the vehicle 102 by communicating with the other vehicle systems 116, or any suitable means. At block 210, when the guidance system 100 determines that the vehicle 102 is not in reverse gear, the HMI 110 generates a command on the display 111 to the user to remove his or her hands from the steering wheel and to shift the vehicle 102 in to reverse. FIG. 8 illustrates an exemplary screenshot 650 of the display 111 of the HMI 110 at block 210. A visual command 652 prompts the user to remove their hands from the steering wheel and to shift the vehicle 102 into the reverse gear. The HMI 110 removes the command from the display 111 when the electronic controller 106 determines that the vehicle 102 is in reverse gear.

Returning to FIG. 2, at block 211, when the electronic controller 106 determines that the vehicle 102 is in reverse gear, the HMI 110 generates a command on the display 111 to the user to remove his or her hands from the steering wheel, at block 211. In some embodiments, after a delay, the command is cleared from the display 111.

Figure 9:
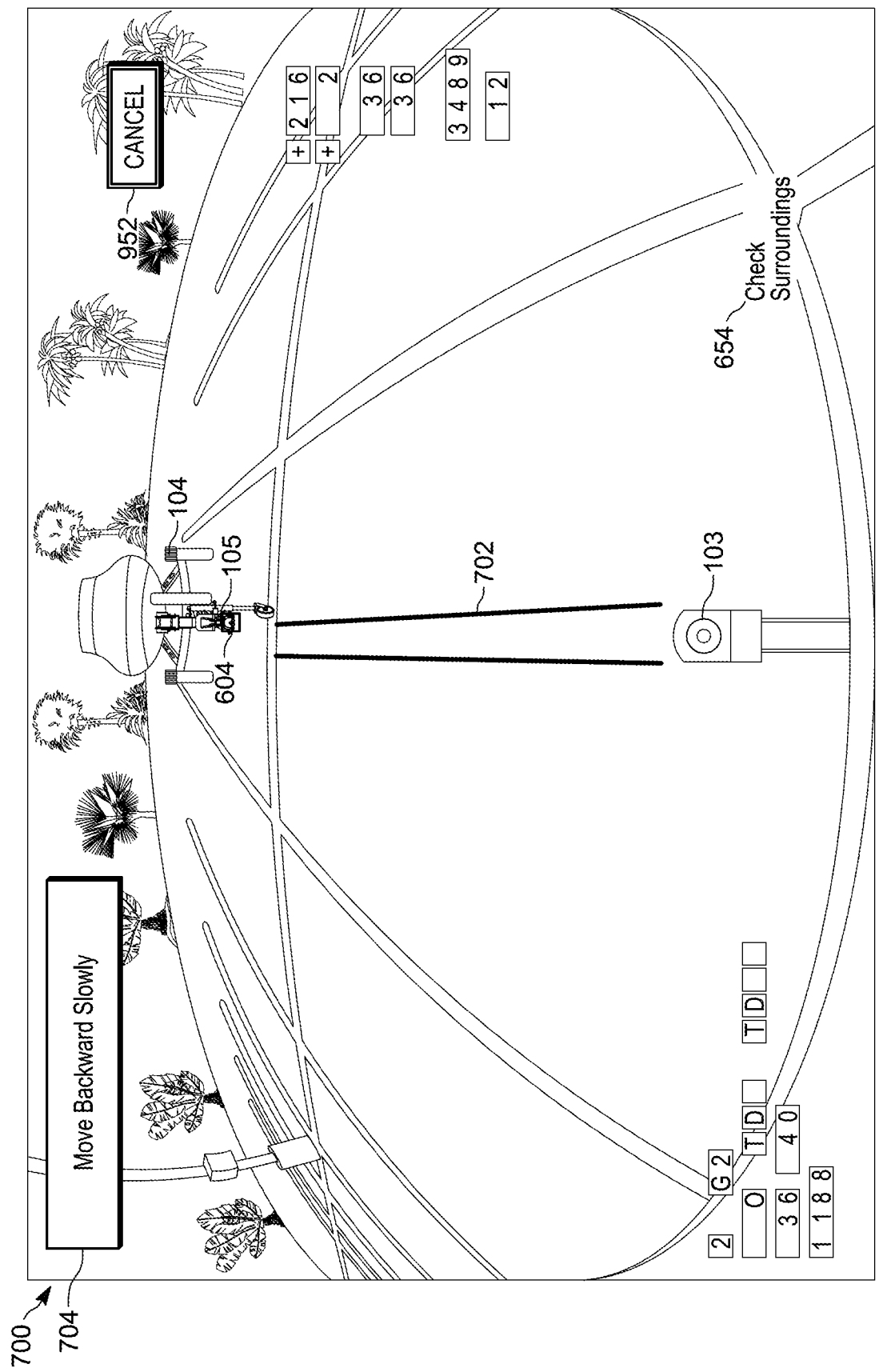
FIG. 9 illustrates an embodiment of a screen displayed by a human machine interface of the trailer hitch guidance system of FIG. 1.
Figure 10:
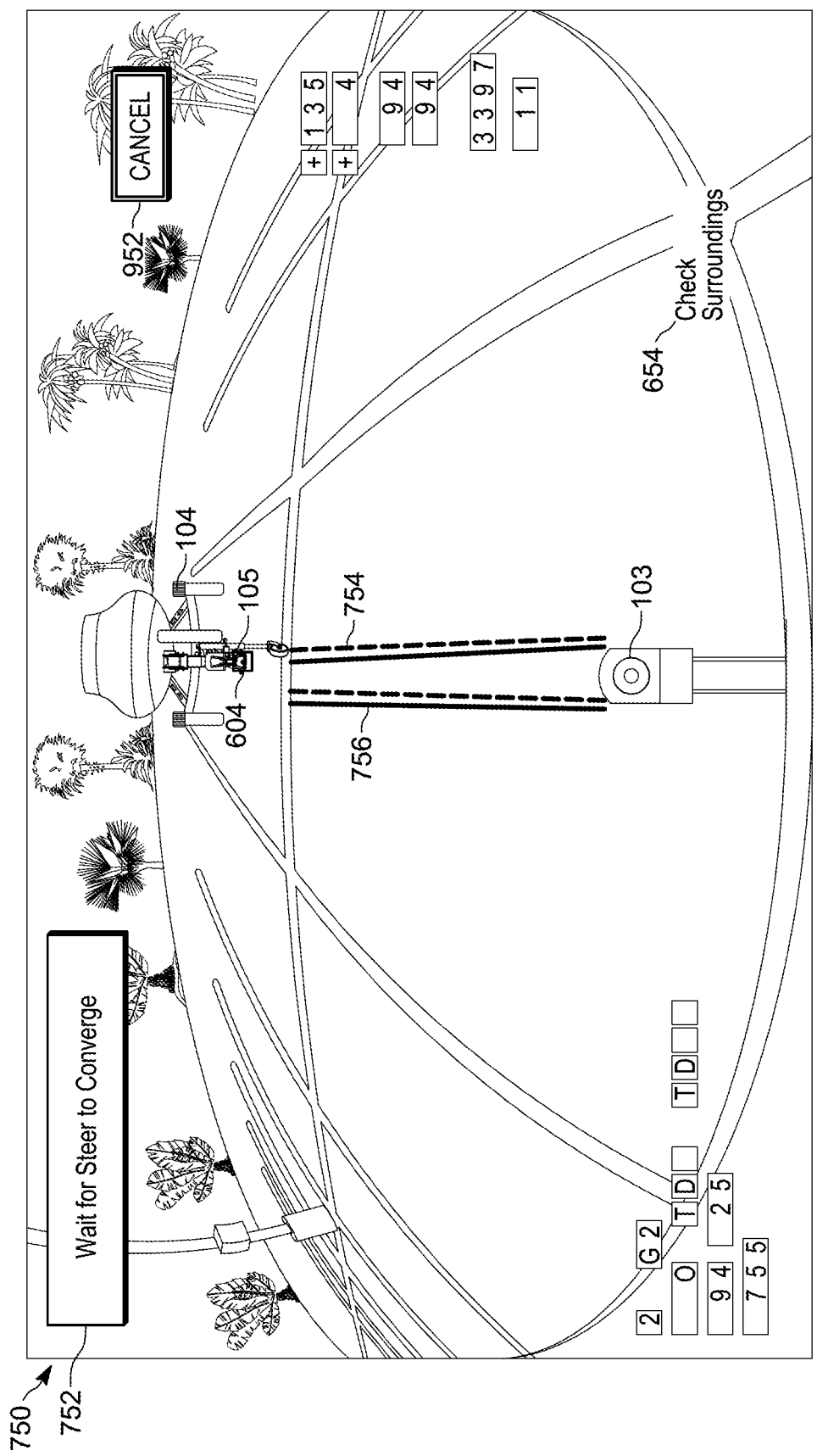
FIG. 10 illustrates an embodiment of a screen displayed by a human machine interface of the trailer hitch guidance system of FIG. 1.

At block 213 the trailer hitch guidance system 100 enters a maneuvering phase. During the maneuvering phase, the electronic controller 106 activates an automatic steering of the vehicle 102. While the automatic steering is active, the electronic controller 106 communicates with the steering controller 114 to automatically steer the vehicle 102 to the trailer coupler 105. While the automatic steering is active, the electronic controller 106 directs the user to control the speed of the vehicle 102 through various commands presented through the HMI 110. The electronic controller 106 may receive information from the camera 108, the velocity sensor 112, the steering controller 114, and the other vehicle systems 116 to determine the commands to send to the steering controller 114 and the HMI 110. For example, during the automatic steering, the electronic controller 106 receives, from the velocity sensor 112, the speed of the vehicle 102. This portion of the method is described more particularly below with respect to FIG. 3. In some embodiments, as illustrated in FIGS. 8-10, while in the maneuvering phase, the HMI 110 includes a warning command 654 on the display 111 for the user to check the surroundings of the vehicle 102 as the vehicle 102 moves towards the trailer coupler 105.

Figure 12:
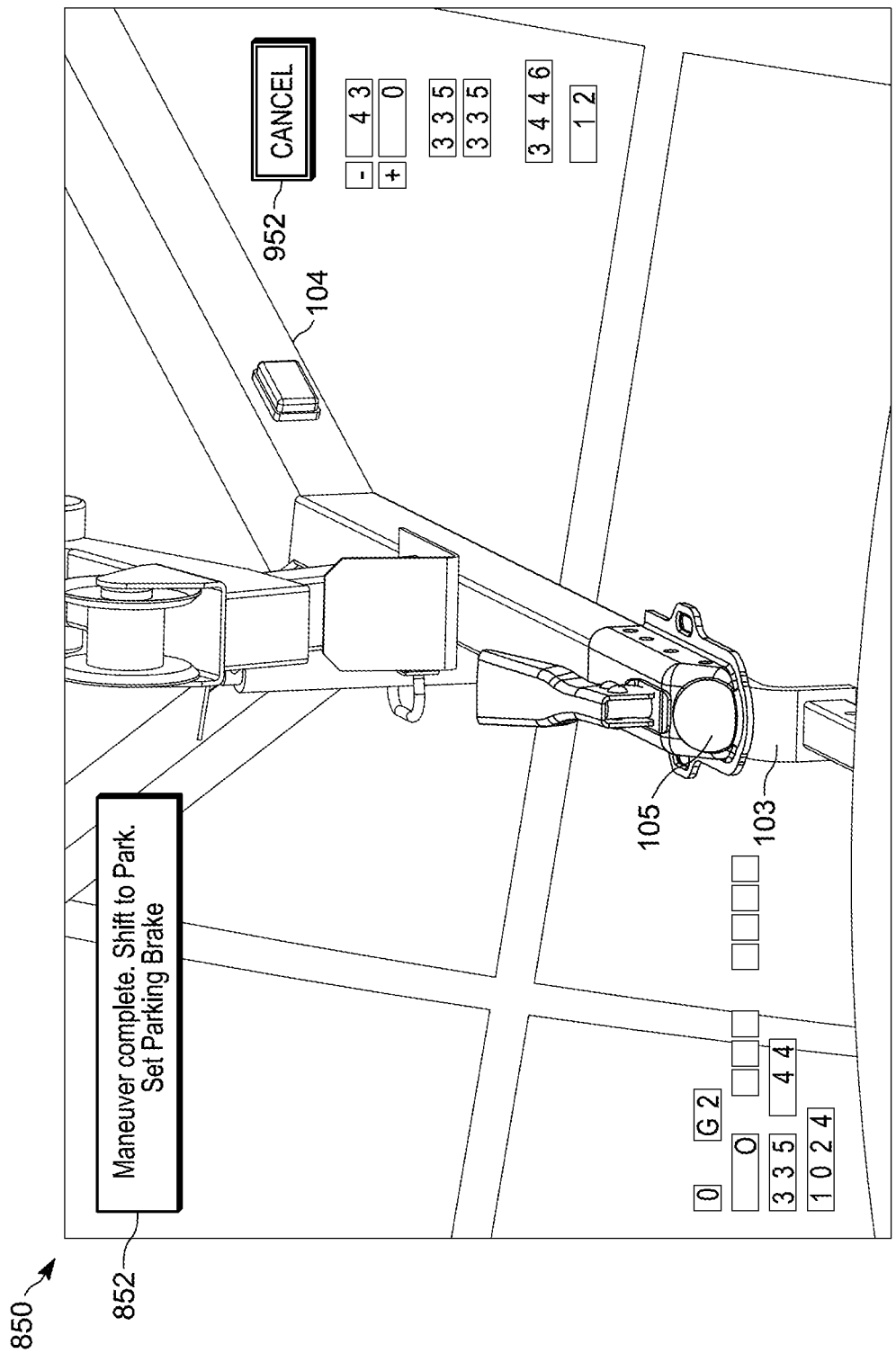
FIG. 12 illustrates an embodiment of a screen displayed by a human machine interface of the trailer hitch guidance system of FIG. 1.

At block 215, the trailer hitch guidance system 100 determines if the trailer hitch 103 is less than a predetermined distance from the trailer coupler 105. The trailer hitch guidance system 100 may determine the distance of the trailer hitch 103 from the trailer coupler 105 using radar sensors (not shown), using information received from the video feed of the camera 108, or another suitable means. At block 217, the HMI 110 displays a visual command to the user to stop the vehicle 102. At block 219, when the electronic controller 106 determines the vehicle 102 has stopped (for example, using information received from the velocity sensor 112), the electronic controller 106 presents a visual command 852 (see FIG. 12) on the display 111 to communicate to the user the maneuvering phase is complete and commands the user to shift to the parking gear of the vehicle 102 and to apply the parking brake of vehicle 102. FIG. 12 is an example screenshot 800 of the display 111 of the HMI 110 at block 219. The electronic controller 106 stops processing information to and from the steering controller 114, terminates the automatic steering of the vehicle 102, and returns control of the steering of the vehicle 102 to the user.

Figure 11:
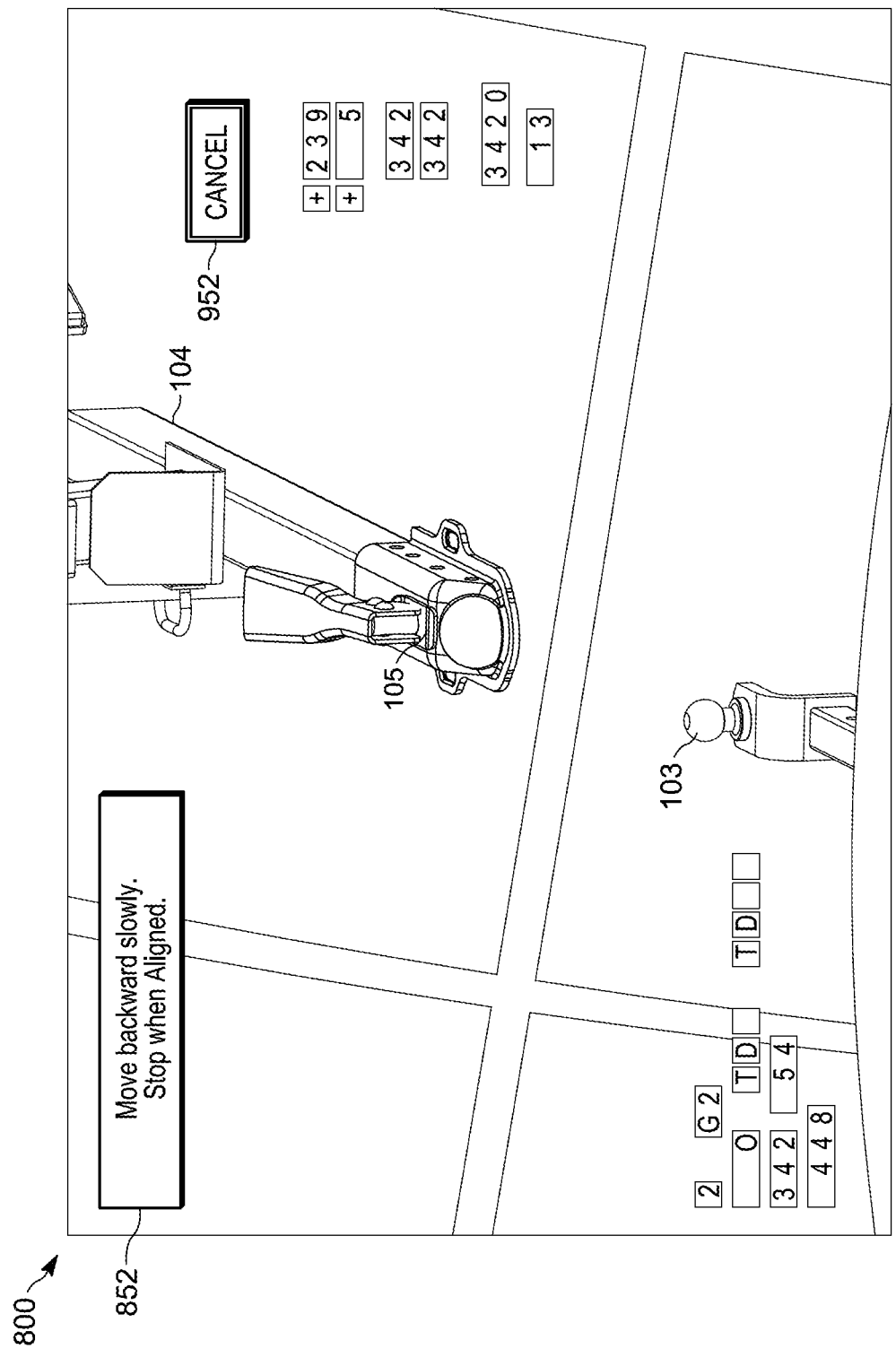
FIG. 11 illustrates an embodiment of a screen displayed by a human machine interface of the trailer hitch guidance system of FIG. 1.

Returning to FIG. 2, at block 221, the trailer hitch guidance system 100 detects whether the vehicle 102 is in park. When the vehicle 102 is not in park, then, at block 222, a top down view feed of the trailer hitch 103 and trailer coupler 105 is displayed by the HMI 110 to provide a visual aid to the user as the user continues to refine the position of vehicle 102. FIG. 11 is an example screenshot of the display 111 at block 222. The top down view feed display on the display 111 may be produced by the electronic controller 106 by modifying the video feed received by camera 108. The HMI 110 communicates using a visual command 852 on the display 111 of HMI 110 instructing the user to continue driving the vehicle 102 slowly and to stop the vehicle 102 when it is aligned with the trailer coupler 105. When the electronic controller 106 determines the vehicle 102 moves more than a predetermined maximum distance away from the trailer coupler 105, for example 0.5 meters, the display 111 will return to the home screen, at block 223, and the guidance system 100 terminates.

During the hitch guidance operation, the guidance system 100 may terminate the hitch guidance operation upon detection of one or more of an exit condition. As described above in regards to FIG. 2 and FIG. 3 below, an exit condition may be one of receiving, via the user interface of the HMI 110, when the speed of the vehicle 102 exceeds a predetermined maximum speed threshold, and determining when a user handles the steering wheel of the vehicle 102 during the automatic steering. An exit condition may also be a cancel command. For example, throughout the hitch guidance operation, a "cancel" command 952 is available on display 111 (See FIGS. 5-12). When the user selects cancel the display on the display 111 the guidance system 100 terminates and returns to the home screen.

In some embodiments, during the maneuver phase of the guidance system 100, when the HMI 110 receives a user input indicating another location/area relative or in proximity to the trailer coupler 105, the automatic steering is adjusted to steer the vehicle 102 towards the trailer coupler 105 based on that location. For example, when the user taps an area close to the trailer coupler 105 on the display 111, the HMI 110 interprets the area to be a new target and communicates with the electronic controller 106 to guide the vehicle 102 to the new target.

Figure 3:
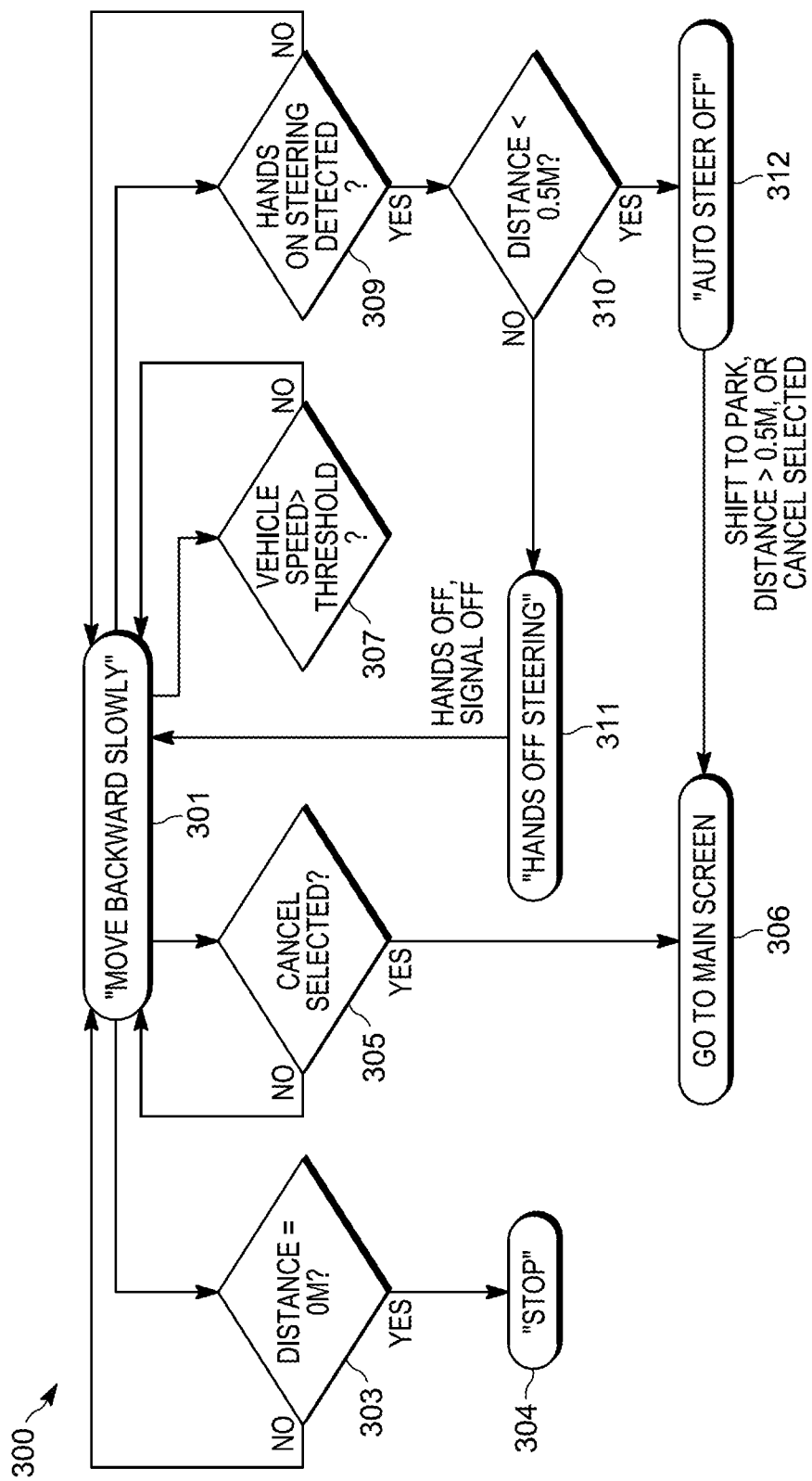
FIG. 3 is a flow chart of method for operating the trailer hitch guidance system of FIG. 1, according to some embodiments.

FIG. 3 illustrates an exemplary method 300 for performing message transitions of the HMI 110 when the guidance system 100 is in maneuvering mode (or phase). At block 301, the HMI 110 generates a command on the display 111 instructing the user to drive the vehicle 102 slowly backwards until the electronic controller 106 detects one of several circumstances. FIG. 9 is an exemplary screenshot 700 of the display 111 at block 301. During the maneuvering mode the electronic controller 106 determines if the vehicle 102 requires a new steering wheel angle above a magnitude to turn the tires to continue guiding the vehicle 102 to the target trailer coupler 105. A predicted path 702 of the vehicle 102 at the present steering wheel angle may be indicated on the display 111 and is updated as the vehicle 102 moves. When a new steering wheel angle is required, the guidance system 100 proceeds into a steering wheel angle change maneuver, explained in detail below with respect to FIG. 4.

Returning to FIG. 3, at block 303, the electronic controller 106 determines if the distance between the trailer hitch 103 and the trailer coupler 105 is within a predetermined distance threshold. When the distance between the trailer hitch 103 and the trailer coupler 105 is within the predetermined distance threshold, the HMI 110, at block 304 presents a visual command to the user to stop the vehicle 102 using the display 111. At block 305, the electronic controller 106 determines if a command to cancel the guidance system 100 is received from the HMI 110. When a command to cancel the guidance system 100 is received by the electronic controller 106, the display 111, at block 306, returns to the home screen and causes the guidance system 100 to terminate.

At block 307, the electronic controller 106 determines if the vehicle 102 exceeds or is within a tolerance meeting a predetermined maximum speed threshold. When the electronic controller 106 determines the speed of vehicle 102 is within the tolerance below the predetermined maximum speed threshold then, at block 308, a command is sent to and shown on the display 111 directing the user to slow down the vehicle 102. At block 309, the electronic controller 106 determines if the user is attempting to steer the vehicle 102 (for example, by receiving information from the steering controller 114). When the electronic controller 106 detects the user is steering the vehicle 102, the electronic controller 106, at block 310, determines if the distance between the trailer hitch 103 and the trailer coupler 105 is less than a second predetermined distance threshold (for example, 0.5 meters). When the distance is not less than the second predetermined distance threshold, then, at block 311, the HMI 110 will display a command to the user to remove their hands from the steering wheel. When the electronic controller 106 determines the user is no longer attempting to steer, the command will clear from the display 111 and the method returns to block 301. Returning to block 310, when the electronic controller 106 determines the distance between the trailer hitch 103 and the trailer coupler 105 is less than the predetermined distance threshold, then, at block 312, the electronic controller 106 stops automatic steering of the vehicle 102, allowing the user steering control of the vehicle 102, and displaying on the display 111 a message that the automatic steering has been stopped.

Figure 4:
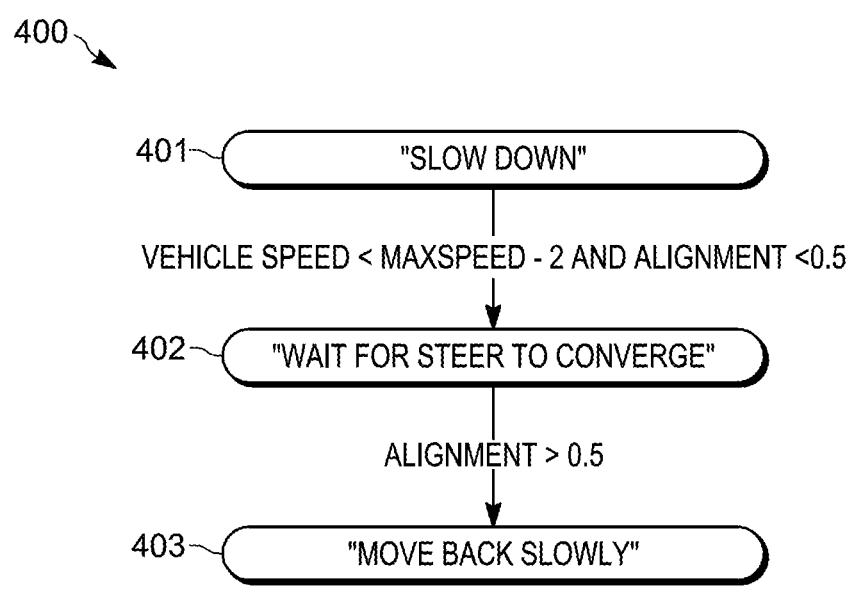
FIG. 4 is a flow chart of method for operating the trailer hitch guidance system of FIG. 1, according to some embodiments.

FIG. 4 illustrates an exemplary method 400 for performing message transitions of the HMI 110 when the electronic controller 106 determines that the vehicle 102 requires a new steering wheel angle above a magnitude (for example, according to information received from the camera 108, the velocity sensor 112, the steering controller 114, and the other vehicle systems 116). When the electronic controller 106 determines that the speed of vehicle 102 is within the tolerance of meeting the maximum speed threshold, for example within two kilometers per hour (kph) below the maximum speed threshold, then, at block 401, the HMI 110 will command the user to slow down via a visual command 704 (See FIG. 9). When the electronic controller 106 determines that the speed of vehicle 102 exceeds the maximum speed threshold, then the HMI 110 will display a message to the user that the maximum speed has been exceeded and that the system will abort, the guidance system 100 terminates, and display on the display 111 returns to the home screen. When the electronic controller 106 detects from information from the velocity sensor 112 that the speed of vehicle 102 is below the tolerance, as set forth above, then at block 402 the display 111 will display a command to the user to wait for the steering wheel to converge. FIG. 10 is an exemplary screenshot 750 of the display 111 at block 402. The screenshot 750 includes a visual command 752 to the user to wait for the steering wheel to converge. The electronic controller 106 turns the steering wheel to until the electronic controller 106 determines the angle of the steering wheel will guide the vehicle 102 to the target trailer coupler 105. In some embodiments, the electronic controller 106 is further configured to calculate and display on the display 111 an intermediate predicted path 754 of the vehicle 102 according to the detected steering wheel angle as the steering wheel angle converges. In some embodiments, the electronic controller 106 is configured to simultaneously display an initial predicted path 756 at the steering wheel angle before the convergence was initiated. Returning to FIG. 4, when the electronic controller 106 determines the alignment of the vehicle 102 to the target trailer coupler 105 is correct, then, at block 403, the guidance system 100 will change to the maneuvering mode and the display 111 will display the visual command 704 to the user to drive the vehicle 102 slowly (See FIG. 9).

Thus, embodiments provide, among other things, a trailer hitch guidance system including a human machine interface. Various features and advantages of the invention are set forth in the following claims.

What is claimed is:

1. A trailer hitch guidance system for a vehicle, the system comprising:
   a display;
   a user interface;
   a camera;
   a velocity sensor configured to measure a speed of the vehicle;
   an electronic controller communicatively coupled to the display, the user interface, and the velocity sensor, and configured to
   receive, via the user interface, a first user input;
   in response to the first user input, present on the display a captured video image from the camera, the captured video image including a coupler;
   determine within the captured video image, based on steering restrictions for the vehicle, an area within which the trailer hitch guidance system is able to guide the vehicle;
   present on the display an indication of the area overlaying the captured video image;
   in response to receiving a second user input indicating a location relative to the coupler, when the electronic controller determines that the vehicle is not in a reverse gear, present, on the display, a visual command to put the vehicle in the reverse gear;
   when the vehicle is in the reverse gear, activate an automatic steering of the vehicle steering the vehicle to the coupler based on the location;
   during the automatic steering the vehicle, receive, from the velocity sensor, the speed of the vehicle;
   when the speed exceeds a first predetermined speed threshold, present on the display a second visual command to slow the vehicle;
   determine when the vehicle is less than a predetermined distance from the coupler;
   in response to the vehicle being less than the predetermined distance from the coupler, display a third visual command to stop the vehicle, shift the vehicle to a parking gear, and set a parking brake;
   determine, after displaying the third command, if the parking brake has been set; and
   when the parking brake is not set, present, on the display a second captured video image, the second captured video image including a top down view of the coupler.

2. The system of claim 1, wherein the electronic controller is further configured to:
   when the parking brake is set, return to a home screen.

3. The system of claim 1, wherein the electronic controller is further configured to:
   receive, via the user interface, a third user input selecting an initial location relative to the coupler within the captured video image;
   display, in response to the third user input, an enhanced view of the initial location relative to the coupler; and
   wherein the second user input indicates the location relative to the coupler by indicating a point on the coupler within the enhanced view.

4. The system of claim 1, wherein the electronic controller is further configured to:
   determine an exit condition; and
   in response to determining the exit condition, returning to a home screen.

5. The trailer hitch system of claim 4, wherein the exit condition is at least one selected from the group consisting of a receiving, via the user interface, a cancel command, when the speed of the vehicle exceeds a predetermined maximum speed threshold, and determining when a user handles a steering wheel of the vehicle.

6. The trailer hitch system of claim 1, wherein the electronic controller is further configured to:
   while the vehicle is in reverse gear, receive, via the user interface, a third user input indicating a second location relative to the coupler; and
   adjust the automatic steering to steer the vehicle to the coupler based on the second location.

7. The trailer hitch system of claim 1, wherein the camera is part of a back-up video camera system of the vehicle.

8. The trailer hitch system of claim 1, wherein at least part of the trailer hitch system is implemented by at least one selected from a group consisting of a smart phone, a smart tablet, a smart watch, or a portable electronic device communicatively coupled to the vehicle.

9. A trailer hitch guidance method for a vehicle, the method comprising:

receiving, via a user interface, a first user input;

in response to the first user input, presenting on a display a captured video image from a camera, the captured video image including a coupler;

determining within the captured video image, based on steering restrictions for the vehicle, an area within which the trailer hitch guidance system is able to guide the vehicle;

presenting on the display an indication of the area overlaying the captured video image;

in response to receiving a second user input indicating a location relative to the coupler, when the vehicle is not in a reverse gear, presenting, on the display, a visual command to put the vehicle in the reverse gear;

when the vehicle is in the reverse gear, activating an automatic steering of the vehicle steering the vehicle to the coupler based on the location;

during the automatic steering the vehicle, receiving, from the velocity sensor, the speed of the vehicle;

when the speed exceeds a first predetermined speed threshold, presenting on the display a second visual command to slow the vehicle;

determining when the vehicle is less than a predetermined distance from the coupler;

in response to the vehicle being less than the predetermined distance from the coupler, displaying a third visual command to stop the vehicle, shift the vehicle to a parking gear, and set a parking brake determining, after displaying the third command, if the parking brake has been set; and when the parking brake is not set, presenting, on the display a second captured video image, the second captured video image including a top down view of the coupler.

10. The trailer hitch guidance method of claim 9 further comprising:

when the parking brake is set, returning to a home screen.

11. The trailer hitch guidance method of claim 9 further comprising:

receiving, via the user interface, a third user input selecting an initial location relative to the coupler within the captured video image;

displaying, in response to the third user input, an enhanced view of the initial location relative to the coupler; and wherein the second user input indicates the location relative to the coupler by indicating a point on the coupler within the enhanced view.

12. The trailer hitch guidance method of claim 9 further comprising:

determining an exit condition; and in response to determining the exit condition, returning to a home screen.

13. The trailer hitch guidance method of claim 12 wherein the exit condition is at least one selected from the group consisting of a receiving, via the user interface, a cancel command, when a speed of the vehicle exceeds a predetermined maximum speed threshold, and determining when a user handles a steering wheel of the vehicle.

14. The trailer hitch guidance method of claim 9 further comprising:

while the vehicle is in a reverse gear, receiving, via the user interface, a third user input indicating a second location relative to the coupler; and adjusting the automatic steering to steer the vehicle to the coupler based on the second location.

15. The trailer hitch guidance method of claim 9 wherein the camera is part of a back-up video camera system of the vehicle.

16. The trailer hitch guidance method of claim 9 wherein at least part of the trailer hitch guidance method is implemented by at least one selected from a group consisting of a smart phone, a smart tablet, a smart watch, or a portable electronic device communicatively coupled to the vehicle.

* * * * *